(12) United States Patent
Umesh et al.

(10) Patent No.: US 11,720,668 B2
(45) Date of Patent: Aug. 8, 2023

(54) SYSTEMS AND METHODS FOR ACCELERATED DETECTION AND REPLACEMENT OF ANOMALOUS MACHINE LEARNING-BASED DIGITAL THREAT SCORING ENSEMBLES AND INTELLIGENT GENERATION OF ANOMALOUS ARTIFACTS FOR ANOMALOUS ENSEMBLES

(71) Applicant: Sift Science, Inc., San Francisco, CA (US)

(72) Inventors: Pradhan Bagur Umesh, San Francisco, CA (US); Yuan Zhuang, San Francisco, CA (US); Hui Wang, San Francisco, CA (US); Nicholas Benavides, San Francisco, CA (US); Chang Liu, San Francisco, CA (US); Yanqing Bao, San Francisco, CA (US); Wei Liu, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 17/963,365

(22) Filed: Oct. 11, 2022

(65) Prior Publication Data

US 2023/0124621 A1  Apr. 20, 2023

Related U.S. Application Data

(60) Provisional application No. 63/254,464, filed on Oct. 11, 2021.

(51) Int. Cl.
*G06F 21/55* (2013.01)
*G06N 20/20* (2019.01)
*G06N 5/04* (2023.01)

(52) U.S. Cl.
CPC .............. *G06F 21/55* (2013.01); *G06N 5/04* (2013.01); *G06N 20/20* (2019.01); *G06F 2221/034* (2013.01)

(58) Field of Classification Search
CPC ..... G06F 21/55; G06F 2221/034; G06N 5/04; G06N 20/20
See application file for complete search history.

(56) References Cited

U.S. PATENT DOCUMENTS 10,860,950 B2 * 12/2020 Chu ..................... G06N 20/00
11,164,093 B1 * 11/2021 Zappella ............... G06N 5/045
(Continued)

*Primary Examiner* — Beemnet W Dada
(74) *Attorney, Agent, or Firm* — Padowithz Alce; Chandler Scheitlin; Alce PLLC

(57) ABSTRACT

A system and method for accelerated anomaly detection and replacement of an anomaly-experiencing machine learning-based ensemble includes identifying a machine learning-based digital threat scoring ensemble having an anomalous drift behavior in digital threat score inferences computed by the machine learning-based digital threat scoring ensemble for a target period; executing a tiered anomaly evaluation for the machine learning-based digital threat scoring ensemble that includes identifying at least one errant machine learning-based model of the machine learning-based digital threat scoring ensemble contributing to the anomalous drift behavior, and identifying at least one errant feature variable of the at least one machine learning-based model contributing to the anomalous drift behavior; generating a successor machine learning-based digital threat scoring ensemble to the machine learning-based digital threat scoring ensemble based on the tiered anomaly evaluation; and replacing the machine learning-based digital threat scoring ensemble with the successor machine learning-based digital threat scoring ensemble.

20 Claims, 9 Drawing Sheets

(56) References Cited

U.S. PATENT DOCUMENTS

| | | | | |
|---|---|---|---|---|
| 2021/0334585 A1* | 10/2021 | Szabo | ................... | G06N 20/20 |
| 2021/0344745 A1* | 11/2021 | Mermoud | ............... | H04W 4/02 |
| 2021/0350277 A1* | 11/2021 | Agrawal | ............ | H04L 63/1425 |
| 2022/0055635 A1* | 2/2022 | Yokoyama | ............ | B60W 50/06 |
| 2022/0156368 A1* | 5/2022 | Spyridopoulos | ......... | G06N 3/08 |
| 2022/0382880 A1* | 12/2022 | Castiglione | .............. | G06N 3/08 |

* cited by examiner

200

┌─────────────────────────────────────────────────────────┐
│ Identifying one or more Drift-Experiencing Ensembles of a │
│ Digital Threat Mitigation Service S210                    │
└─────────────────────────────────────────────────────────┘

┌─────────────────────────────────────────────────────────┐
│ Identifying one or more Errant Machine Learning Models of a │
│ Drift-Experiencing Ensemble S220                          │
└─────────────────────────────────────────────────────────┘

┌─────────────────────────────────────────────────────────┐
│ Identifying one or more Errant Features of one or more Errant │
│ Machine Learning Models of a Drift-Experiencing Ensemble  │
│ S230                                                      │
└─────────────────────────────────────────────────────────┘

┌─────────────────────────────────────────────────────────┐
│ Generating a Successor Ensemble S240                      │
└─────────────────────────────────────────────────────────┘

┌ ─ ─ ─ ─ ─ ─ ─ ─ ─ ─ ─ ─ ─ ─ ─ ─ ─ ─ ─ ─ ─ ─ ─ ─ ─ ─ ─ ┐
│ Constructing an Intelligent Ensemble Storyboard for a     │
│ Subscriber of a Drift-Experiencing Ensemble S250          │
└ ─ ─ ─ ─ ─ ─ ─ ─ ─ ─ ─ ─ ─ ─ ─ ─ ─ ─ ─ ─ ─ ─ ─ ─ ─ ─ ─ ┘

FIGURE 2

SYSTEMS AND METHODS FOR ACCELERATED DETECTION AND REPLACEMENT OF ANOMALOUS MACHINE LEARNING-BASED DIGITAL THREAT SCORING ENSEMBLES AND INTELLIGENT GENERATION OF ANOMALOUS ARTIFACTS FOR ANOMALOUS ENSEMBLES

CROSS-REFERENCE TO RELATED APPLICATIONS

This application claims the benefit of U.S. Provisional Application No. 63/254,464, filed 11 Oct. 2021, which is incorporated in its entirety by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enable entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one embodiment, a method for accelerated anomaly detection and replacement of an anomaly-experiencing machine learning-based ensemble includes identifying, by one or more computers, a machine learning-based digital threat scoring ensemble having an anomalous drift behavior in digital threat score inferences computed by the machine learning-based digital threat scoring ensemble for a target period; executing, based on the identifying, a tiered anomaly evaluation for the machine learning-based digital threat scoring ensemble, wherein the tiered anomaly evaluation includes: identifying at least one machine learning-based model of the machine learning-based digital threat scoring ensemble contributing to the anomalous drift behavior, and identifying at least one feature variable of the at least one machine learning-based model contributing to the anomalous drift behavior; generating a potential successor machine learning-based digital threat scoring ensemble to the machine learning-based digital threat scoring ensemble based on the tiered anomaly evaluation, wherein the potential successor machine learning-based digital threat scoring ensemble mitigates the anomalous drift behavior; and replacing the machine learning-based digital threat scoring ensemble with the potential successor machine learning-based digital threat scoring ensemble based on one or more ensemble metrics computed for the potential successor machine learning-based digital threat scoring ensemble satisfying one or more efficacy benchmarks.

In one embodiment, the method further includes sourcing, by the one or more computers, threat score distribution data computed by the machine learning-based digital threat scoring ensemble for each day included within the target period; and detecting, by the one or more computers, an occurrence of a statistically significant upward trend or a statistically significant downward trend in the threat score distribution data over the target period, wherein: the identifying the machine learning-based digital threat scoring ensemble is based on the detecting of the statistically significant upward trend or the statistically significant downward trend.

In one embodiment, the method further includes executing one or more intelligent ensemble simulations that inform a structure of the potential successor machine learning-based digital threat scoring ensemble, and the structure of the potential successor machine learning-based digital threat scoring ensemble excludes the at least one machine learning-based model of the machine learning-based digital threat scoring ensemble contributing to the anomalous drift behavior, wherein the generating the potential successor machine learning-based digital threat scoring ensemble is further based on the execution of the one or more intelligent ensemble simulations.

In one embodiment, the method further includes executing one or more intelligent ensemble simulations that inform a structure of the potential successor machine learning-based digital threat scoring ensemble, and the structure of the potential successor machine learning-based digital threat scoring ensemble includes a machine learning-based model of a distinct type in substitution of the at least one machine learning-based model of the machine learning-based digital threat scoring ensemble contributing to the anomalous drift behavior, wherein the generating the potential successor machine learning-based digital threat scoring ensemble is further based on the execution of the one or more intelligent ensemble simulations.

In one embodiment, the method further includes executing one or more intelligent ensemble simulations that inform a structure of the potential successor machine learning-based digital threat scoring ensemble, and the structure of the potential successor machine learning-based digital threat scoring ensemble excludes, as model input, the at least one feature variable contributing to the anomalous drift behavior, wherein the generating the potential successor machine learning-based digital threat scoring ensemble is further based on the execution of the one or more intelligent ensemble simulations.

In one embodiment, the method further includes executing one or more intelligent ensemble simulations that inform a structure of the potential successor machine learning-based digital threat scoring ensemble, and the structure of the potential successor machine learning-based digital threat scoring ensemble is associated with an increase in the learned feature weighting of the at least one feature variable contributing to the anomalous drift behavior.

In one embodiment, the method further includes executing one or more intelligent ensemble simulations that inform a structure of the potential successor machine learning-based digital threat scoring ensemble, and the structure of the potential successor machine learning-based digital threat scoring ensemble is associated with a decrease in the learned feature weighting of the at least one feature variable contributing to the anomalous drift behavior.

In one embodiment, the method further includes wherein the machine learning-based digital threat scoring ensemble is one of a volume of distinct machine learning-based digital threat scoring ensembles in operational use by a digital threat mitigation service, and one or more machine learning-based digital threat scoring ensembles of the volume is implemented for a distinct subscriber subscribing to the digital threat mitigation service.

In one embodiment, the method further includes generating an anomaly rationale based on findings data derived from the tiered anomaly evaluation for the at least one machine learning-based model or the at least one feature variable contributing to the anomalous drift behavior; displaying, on a web-based user interface of the digital threat mitigation service, one or more anomalous ensemble artifacts, wherein the one or more anomalous ensemble artifacts include: one or more pieces of explainable content that provides the anomaly rationale for the at least one machine learning-based model or the at least one feature variable contributing to the anomalous drift behavior.

In one embodiment, a method for accelerated drift detection and replacement of a drift-experiencing machine learning-based ensemble includes evaluating, by one or more computers, a plurality of machine learning-based digital threat scoring ensembles in operational use by a digital threat mitigation platform; identifying, by the one or more computers, an anomalous machine learning-based digital threat scoring ensemble experiencing an anomalous drift behavior based on the evaluation; executing, by the one or more computers, an anomaly evaluation for the anomalous machine learning-based digital threat scoring ensemble based on the identifying, wherein the anomaly evaluation includes: detecting at least one errant machine learning-based model of the anomalous machine learning-based digital threat scoring ensemble contributing to the anomalous drift behavior; generating, based on executing one or more intelligent ensemble simulations, a plurality of candidate successor machine learning-based ensembles to the anomalous machine learning-based digital threat scoring ensemble; and replacing, by the one or more computers, the anomalous machine learning-based digital threat scoring ensemble with one of the plurality of candidate successor machine learning-based ensembles based on one or more ensemble metrics computed for the one of the plurality of candidate successor machine learning-based ensembles satisfying or exceeding one or more ensemble efficacy benchmarks.

In one embodiment, the method includes wherein the identifying the anomalous machine learning-based digital threat scoring ensemble occurs prior to a subscriber associated with the anomalous machine learning-based digital threat scoring ensemble identifying the anomalous drift behavior.

In one embodiment, the method includes wherein replacing the anomalous machine learning-based digital threat scoring ensemble with the one of the plurality of candidate successor machine learning-based ensembles occurs before the subscriber associated with the anomalous machine learning-based digital threat scoring ensemble identifies the anomalous drift behavior.

In one embodiment, the method further includes computing, by the one or more computers, for each of the plurality of candidate successor machine learning-based ensembles an ensemble accuracy value based on simulation results of the one or more intelligent ensemble simulations; identifying, by the or more computers, a target candidate successor machine learning-based ensemble of the plurality of candidate successor machine learning-based ensembles that maximizes an ensemble accuracy efficacy metric; and automatically replacing, by the one or more computers, the anomalous machine learning-based digital threat scoring ensemble with the target candidate successor machine learning-based ensemble based on the identifying.

In one embodiment, the method further includes computing, by the one or more computers, for each of the plurality of candidate successor machine learning-based ensembles an ensemble stability value based on simulation results of the one or more intelligent ensemble simulations; identifying, by the or more computers, a target candidate successor machine learning-based ensemble of the plurality of candidate successor machine learning-based ensembles that maximizes an ensemble stability efficacy metric; and automatically replacing, by the one or more computers, the anomalous machine learning-based digital threat scoring ensemble with the target candidate successor machine learning-based ensemble based on the identifying.

In one embodiment, the method further includes generating an anomaly rationale based on findings data derived from the anomaly evaluation; generating an ensemble replacement rationale based on simulation results derived from the one or more intelligent ensemble simulations; displaying, on a web-based user interface of the digital threat mitigation platform, an anomalous ensemble artifact accessible to a target subscriber impacted by the anomalous machine learning-based digital threat scoring ensemble, wherein the anomalous ensemble artifact includes: one or more pieces of explainable content that provides the anomaly rationale for the at least one errant machine learning-based model contributing to the anomalous drift behavior, and one or more pieces of explainable content that provides the ensemble replacement rationale for replacing the anomalous machine learning-based digital with the one of the plurality of candidate successor machine learning-based ensembles.

In one embodiment, a method for accelerated drift detection and replacement of an anomaly-experiencing machine learning-based ensemble includes evaluating, by one or more computers, a plurality of machine learning-based ensembles in operational use by a digital threat mitigation platform for a target period; identifying, by the one or more computers, an anomalous machine learning-based ensemble experiencing an anomalous drift behavior based on the evaluation; generating, by the one or more computers, at least one successor machine learning-based ensemble for the anomalous machine learning-based ensemble based on performing one or more intelligent ensemble simulations; and replacing, by the one or more computers, the anomalous machine learning-based ensemble experiencing the anomalous drift behavior with the at least one successor machine learning-based ensemble based on the at least one successor machine learning-based ensemble satisfying one or more ensemble characteristics.

In one embodiment, the method includes wherein the anomalous machine learning-based ensemble is associated with a target subscriber implementing a plurality of automated decisioning workflows digitally associated with the anomalous machine learning-based ensemble; and the one or more ensemble characteristics corresponds to a confirmation that: the at least one successor machine learning-based ensemble mitigates the anomalous drift behavior, and replacing the anomalous machine learning-based ensemble with the at least one successor machine learning-based ensemble prevents the target subscriber from having to modify the plurality of automated decisioning workflows.

In one embodiment, the method includes wherein the anomalous machine learning-based ensemble is associated with a target subscriber implementing a plurality of automated decisioning workflows digitally associated with the anomalous machine learning-based ensemble; and replacing the anomalous machine learning-based ensemble with the at least one successor machine learning-based includes notifying the target subscriber about the replacing if the replacing impacts at least one automated decisioning workflow of the plurality of automated decisioning workflows.

In one embodiment, the method includes wherein the anomalous machine learning-based ensemble experiencing the anomalous drift behavior is automatically identified by the one or more computers based on observing a statistically significant downward trend or a statistically significant upward trend in threat score distribution data over the target period.

In one embodiment, the method includes wherein the method is implemented by a digital threat mitigation service, and the digital threat mitigation service automatically executes the method at predetermined intervals.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
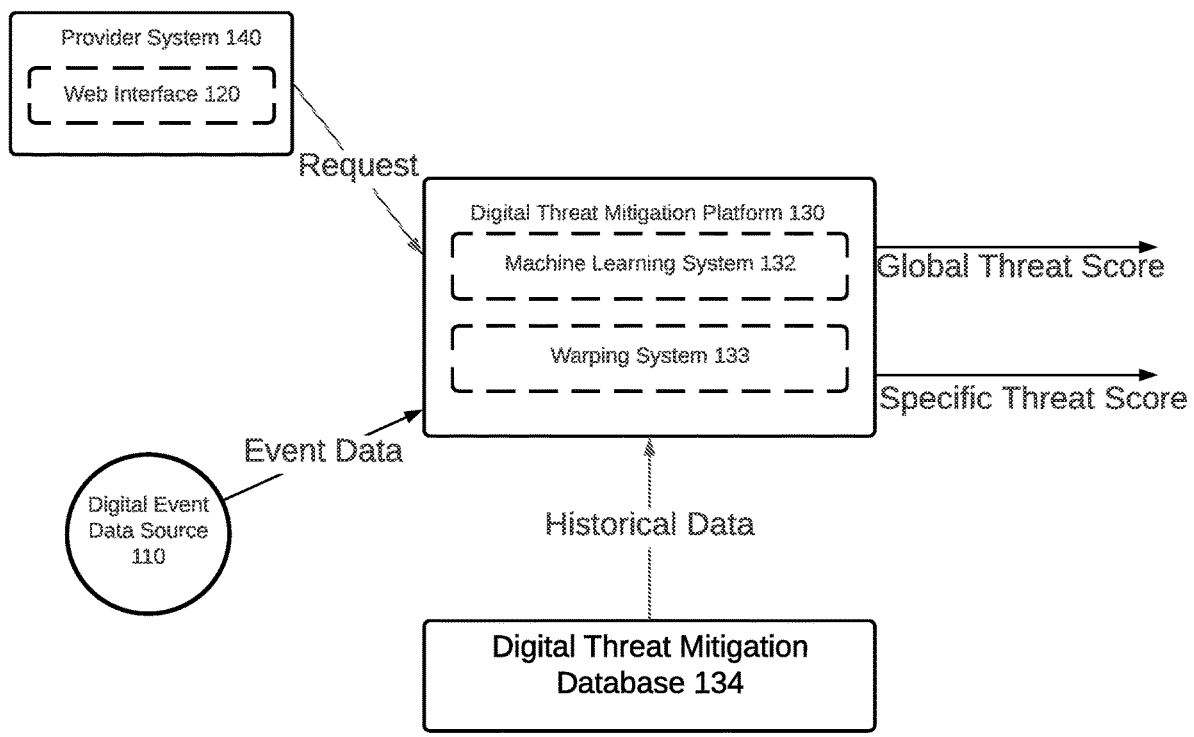
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954,879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current digital events to mitigate or eliminate a digital threat associated therewith. Additionally, or alternatively, in one or more embodiments, digital event data processing decisions may be automated via automated decisioning workflows, as described in U.S. Pat. No. 9,954,879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, a unified threat model.

1. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources 110 may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implements at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enables users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communicate with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Additionally, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

2. Methods for Accelerated Detection and Replacement of Anomalous Machine Learning-Based Ensembles and Intelligent Generation of Anomalous Artifacts for the Anomalous Ensembles As shown in FIG. 2, the method 200 for accelerated identification and replacement of anomalous machine learning-based digital threat scoring ensembles and intelligent generations of anomalous artifacts for explaining behaviors of anomalous ensembles may include identifying one or more drift-experiencing (machine learning-based) ensembles of a digital threat mitigation service S210, identifying one or more errant machine learning models of the drift-experiencing ensemble S220, identifying one or more errant features of the one or more errant machine learning models of the drift-experiencing ensemble S230, and generating a successor ensemble to replace the drift-experiencing ensemble S240. The method may optionally include constructing an intelligent ensemble storyboard for a subscriber impacted by the drift-experiencing ensemble S250.

2.10 Identifying Drift-Experiencing Ensembles

Figure 3:
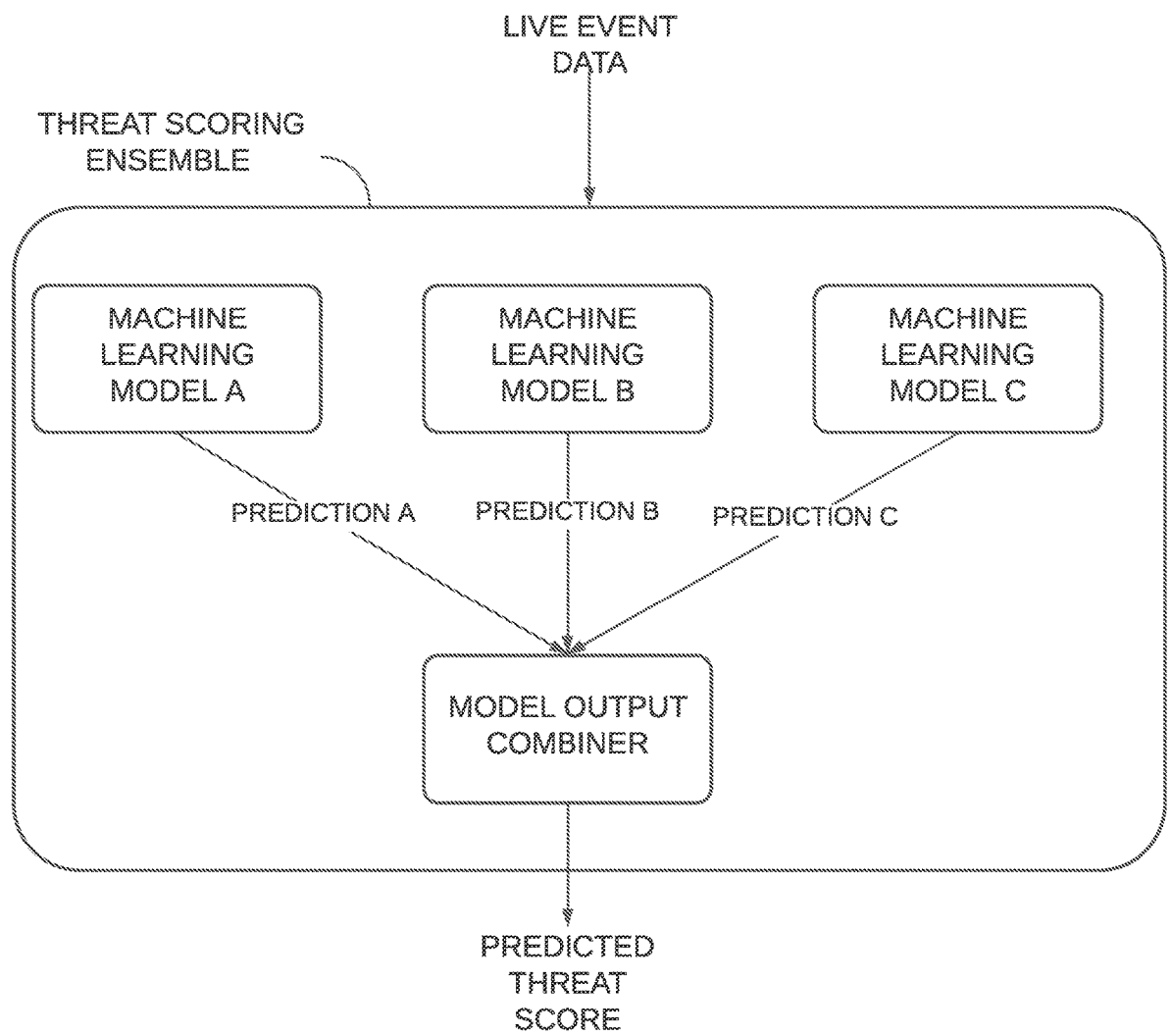
FIG. 3 illustrates an example schematic of a production-implemented digital threat scoring ensemble in accordance with one or more embodiments of the present application.

S210, which includes identifying one or more anomaly-experiencing ensembles, may function to identify one or more production-implemented ensembles of machine learning models of a digital threat mitigation service that may be experiencing an anomalous behavior. A production-implemented ensemble, as generally referred to herein, may include a plurality of machine learning-based models that function together to generate an optimal predictive model for digital threat scoring of live digital events (e.g., online transactions, online activities, etc.) and/or live digital actors (e.g., users), as shown generally by way of example in FIG. 3. In one or more preferred embodiments, each subscriber of a digital threat mitigation service may have a subscriber-specific digital threat scoring ensemble and S210 may function to (e.g., automatically) and/or periodically evaluate or monitor, by one or more computers, each subscriber-specific digital threat scoring ensemble for anomalies (e.g., drift-type anomalies, shift-type anomalies, or the like).

In one or more embodiments, S210 may function at an ensemble-level to identify and/or detect when a production-implemented ensemble of a subscriber may be producing a digital threat score distribution having a drifting behavior. For example, S210 may function to identify a drift-type anomaly occurring in one or more production-implemented (digital threat scoring) ensembles in operational use by the system or service 100 implementing the method 200 in response to (or based on) detecting a gradual increase or a gradual decrease in an ensemble threat score distribution when compared to a baseline or expected ensemble threat score distribution. For instance, S210 may function to identify a drift-type anomaly occurring in one or more production-implemented (machine learning-based) ensembles in response to detecting a measured drift of a target (or subject) ensemble exceeding or satisfying an anomaly threshold or drift threshold. In one or more non-limiting examples, S210 may function to identify a drift-type anomaly occurring in one or more production-implemented (machine learning-based) ensembles in response to detecting an approximate five (5) percent increase in a current ensemble digital threat score distribution when compared to a baseline ensemble digital threat score distribution, an approximate four (4) percent increase in a current ensemble digital threat score distribution when compared to a baseline ensemble digital threat score distribution, an approximate three (3) percent increase in a current ensemble digital threat score distribution when compared to a baseline ensemble digital threat score distribution, an approximate two (2) percent increase in a current ensemble digital threat score distribution when compared to a baseline ensemble digital threat score distribution, and/or an approximate one (1) percent increase in a current ensemble digital threat score distribution when compared to a baseline ensemble digital threat score distribution. In the one or more examples described above, S210 may function to measure or observe the identified difference between a current distribution of a target ensemble and a distribution of a baseline or benchmark ensemble to determine whether the difference may be sufficient to detect an anomalous drift in the target ensemble, as described in more detail below.

Figure 4:
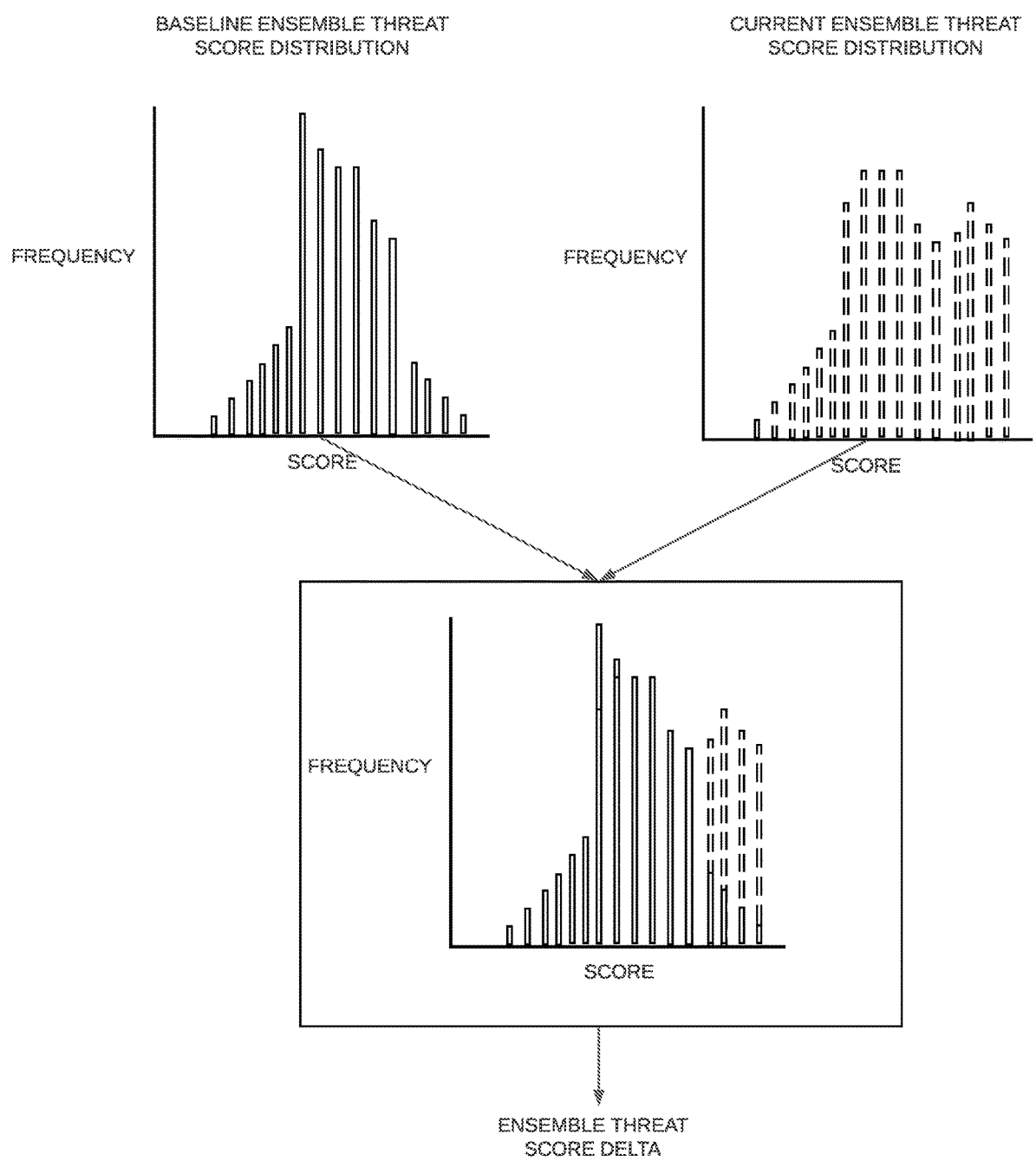
FIG. 4 illustrates an example representation of evaluating, at an ensemble-level, a baseline ensemble threat score distribution and a current ensemble threat score distribution for a subject machine learning-based ensemble in accordance with one or more embodiments of the present application.

In one or more embodiments, S210 may function to identify a drift-type anomaly occurring in one or more production-implemented (digital threat scoring) ensembles in operational use by the system or service 100 implementing the method 200 in response to (or based on) detecting a gradual decrease in an ensemble (digital) threat score distribution when evaluated against a baseline ensemble threat score distribution. For instance, S210 may function to identify a drift-type anomaly occurring in one or more digital threat scoring ensembles in response to observing an approximate five (5) percent decrease in a current ensemble threat score distribution when compared to a baseline ensemble threat score distribution, an approximate four (4) percent decrease in a current ensemble threat score distribution when compared to a baseline ensemble threat score distribution, an approximate three (3) percent decrease in a current ensemble threat score distribution when compared to a baseline ensemble threat score distribution, an approximate two (2) percent decrease in a current ensemble threat score distribution when compared to a baseline ensemble threat score distribution, and/or an approximate one (1) percent decrease in a current ensemble threat score distribution when compared to a baseline ensemble threat score distribution. In other words, S210 may function to (e.g., automatically) detect, by one or more computers, a drift-type anomaly occurring at an ensemble-level via the one or more computers based on observing or identifying a change in a current (or target) ensemble threat score distribution when compared to a baseline ensemble threat score distribution, as shown generally by way of example in FIG. 4.

It shall be noted that, in one or more embodiments, for S210 to identify when one or more production-implemented ensembles of a volume of production-implemented machine learning-based ensembles may be deviating or drifting from an expected or baseline state, S210 may function to periodically evaluate computed ensemble outputs for each of a plurality of production-implemented digital threat scoring ensembles of a digital threat mitigation service. For example, S210 may function to periodically evaluate a plurality of production-implemented threat scoring ensembles on a weekly basis, a bi-weekly basis, a monthly basis, a quarterly basis, a yearly basis, and/or any other suitable period for early detection of when anomalies (e.g., drift-type anomalies) may be occurring in digital threat scoring ensembles underpinning the digital threat mitigation service. It shall be further noted that the frequency at which S210 may function to evaluate threat scoring ensembles of a digital threat mitigation service may be encoded statically or dynamically into at least a portion of a system (e.g., the system 100 implementing the method 200) and may vary between subscribers or may be constant across a majority of the subscriber base of the system 100 implementing the method 200.

In one or more embodiments, evaluating a target machine learning-based threat scoring ensemble of a digital threat mitigation service may optionally include collecting ensemble threat score data (e.g., ensemble output data) at distinct time periods for an ensemble-level pairwise analysis. In such embodiments, S210 may function to collect ensemble threat score data associated with the target ensemble for a current time period (e.g., most recent week (e.g., a current week), most recent month (e.g., a current month), most recent quarter (e.g., a current quarter), most recent year (e.g., a current year) that may be used to generate a current ensemble threat score distribution of the target ensemble and S210 may further function to collect ensemble threat score data associated with a baseline time period (e.g., baseline threat score data of a training period, baseline threat score data of a historical time period similar to that of a current time period (e.g., a current time period may be the third quarter of 2021 and a baseline time period may be the third quarter of 2020, a current time period may be a current year (e.g., 2021) and a baseline time period may be a previous year (e.g., 2020)) that may be used to generate a baseline ensemble threat score distribution of the target ensemble for the ensemble-level pairwise evaluation.

Statistical Anomaly Evaluation

In a first implementation, in response to (or based on) collecting and/or identifying ensemble threat score data of a current time period and ensemble threat score data of a baseline time period for a target (digital threat scoring) ensemble, S210 may function to statistically compare a current ensemble threat score distribution and a baseline ensemble threat score distribution to identify if the target threat scoring ensemble may be experiencing an anomaly (e.g., a drift-type anomaly). Stated differently, S210 may function to perform one or more statistical comparison tests between a baseline ensemble threat score distribution and a current ensemble threat score distribution of a target threat scoring ensemble to determine if the ensemble score distributions between the two time periods are statistically distinct or different.

Accordingly, in response to the statistical evaluation, S210 may function to (e.g., automatically) assess, by one or more computers, the outcome of the one or more statistical comparison tests against one or more ensemble drift confidence levels to determine if a difference between the two ensemble score distributions for a target ensemble is statistically different. In other words, in one or more embodiments, if S210 determines that the baseline ensemble score distribution is statistically different from the current ensemble score distribution than an anomaly may be detected and vice versa.

Anomaly Evaluation

In a variation to the first implementation, in response to retrieving and/or identifying ensemble threat score data of a baseline (historical) time period and ensemble threat score data of a current time period for a target threat scoring ensemble, S210 may function to measure a difference (or delta) between an ensemble threat score distribution of a baseline time period and an ensemble threat score distribution of a current time period.

Accordingly, in response to computing the difference or delta between the ensemble threat score distribution of the baseline time period and the ensemble threat score distribution of the current time period, S210 may function to assess if the computed ensemble delta or ensemble variance exceeds one or more ensemble drift thresholds to determine whether the target threat scoring ensemble under evaluation may be an anomalous ensemble (e.g., anomaly-like, experiencing drift, etc.).

Additionally, or alternatively, S210 may function to identify an anomalous behavior of a threat scoring ensemble based on an evaluation involving a trend test (e.g., a Mann-Kendall test or the like) of threat score values predicted by the threat scoring ensemble over a selected period. In one example, S210 may function to collect daily threat score distributions of a target threat score ensemble over a period (e.g., a target week, a target month, a target quarter, or any suitable time span) and S210 may function to identify whether one or more trends (e.g., upward trend, downward trend, etc.) in the movement of the threat score exist in the threat score distribution data associated with the target threat score ensemble. Accordingly, if a trend (upward, downward, etc.) is detected within the threat score distribution data of the target score ensemble, S210 may function to identify the threat scoring ensemble as an anomalous ensemble, a drift-experiencing machine learning-based ensemble, or the like.

Stated another way, in one or more embodiments, prior to detecting or identifying a target or subject machine learning-based digital threat scoring ensemble of a volume of machine learning-based digital threat scoring ensembles as having an anomalous drift behavior, S210 may function to source, by one or more computers, threat score data (e.g., threat score distribution data, etc.) computed by the target or subject machine learning-based digital threat scoring ensemble for each day included within the target period and S210 may function to detect, by the one or more computers, an occurrence of a statistically significant upward trend or a statistically significant downward trend in the threat score distribution data over the target period using a statistical trend test. Stated differently, in one or more embodiments, S210 may function to (e.g., automatically) identify or tag the target or subject machine learning-based digital threat scoring ensemble as a drift-experiencing ensemble or the like based on the detecting of the statistically significant upward trend or the statistically significant downward trend, if applicable.

It shall be noted that in response to identifying and/or detecting a threat score anomaly (e.g., threat score drift anomaly) in a target or subject machine learning-based digital threat scoring ensemble, S210 may function to tag or identify the target or subject threat scoring ensemble as an anomalous ensemble (e.g., an anomaly-experiencing ensemble).

It shall be recognized that S210 may function to simultaneously (or in parallel) identify more than one machine learning-based digital threat scoring ensemble of the digital threat mitigation platform as anomalous.

It shall be further recognized that S210 may function to identify a subject machine learning-based digital threat scoring ensemble as anomalous based on the system or service 100 implementing the method 200 receiving a notification from the subscriber indicating the subject machine learning-based digital threat scoring ensemble as anomalous (e.g., experiencing a drifting behavior).

It shall be further recognized that based on identifying an anomalous ensemble, the system 100 and/or the method 200 may function to (e.g., automatically) investigate or evaluate the anomalous ensemble at one or more increased granularity levels (e.g., at a model-level and/or at a feature-level) as discussed in more detail below.

2.20 Identifying Errant Machine Learning Models of a Drift-Experiencing Ensemble | Component Model Analysis S220, which includes identifying one or more errant machine learning models of an anomalous machine learning-based digital threat scoring ensemble, may function to evaluate a plurality of machine learning-based models of the anomalous machine learning-based digital threat scoring ensemble to identify one or more errant machine learning models that may be contributing to an anomalous behavior of the target ensemble. An errant machine learning model of an anomalous ensemble, as generally described herein, may be identified when a predictive output distribution of a machine learning-based model of an anomalous ensemble may be statistically and adversely changing and/or drifting over time. In one or more preferred embodiments, in response to (or based on) identifying an anomalous digital threat scoring ensemble of machine learning models, S220 may function to (e.g., simultaneously and/or automatically) evaluate, by one or more computers each of the plurality of machine learning-based models of the anomalous (digital threat scoring) ensemble to identify one or more errant (e.g., faulty) machine learning models that may be contributing to an ensemble threat score anomaly (e.g., threat score drift or the like).

In one or more embodiments, in response to or based on S210 identifying an anomalous machine learning-based digital threat scoring ensemble having an anomalous drift behavior, S220 may function to identify one or more errant machine learning-based models underpinning the anomalous ensemble. It shall be noted that, in one or more embodiments, an identified (threat score) anomaly occurring in a digital threat scoring ensemble may be the result of one or more errant (e.g., faulty) machine learning models. Thus, in one or more embodiments, S220 may function to automatically evaluate, by one or more computers, each machine learning-based model of the anomalous ensemble to identify, at a model-level, the machine learning-based models that may be drifting and/or operating irregularly (e.g., an errant model). For instance, in a nonlimiting example, S220 may function to identify that a naïve-bayes machine learning-based model of an anomalous ensemble may be contributing to the anomalous behavior.

Figure 5:
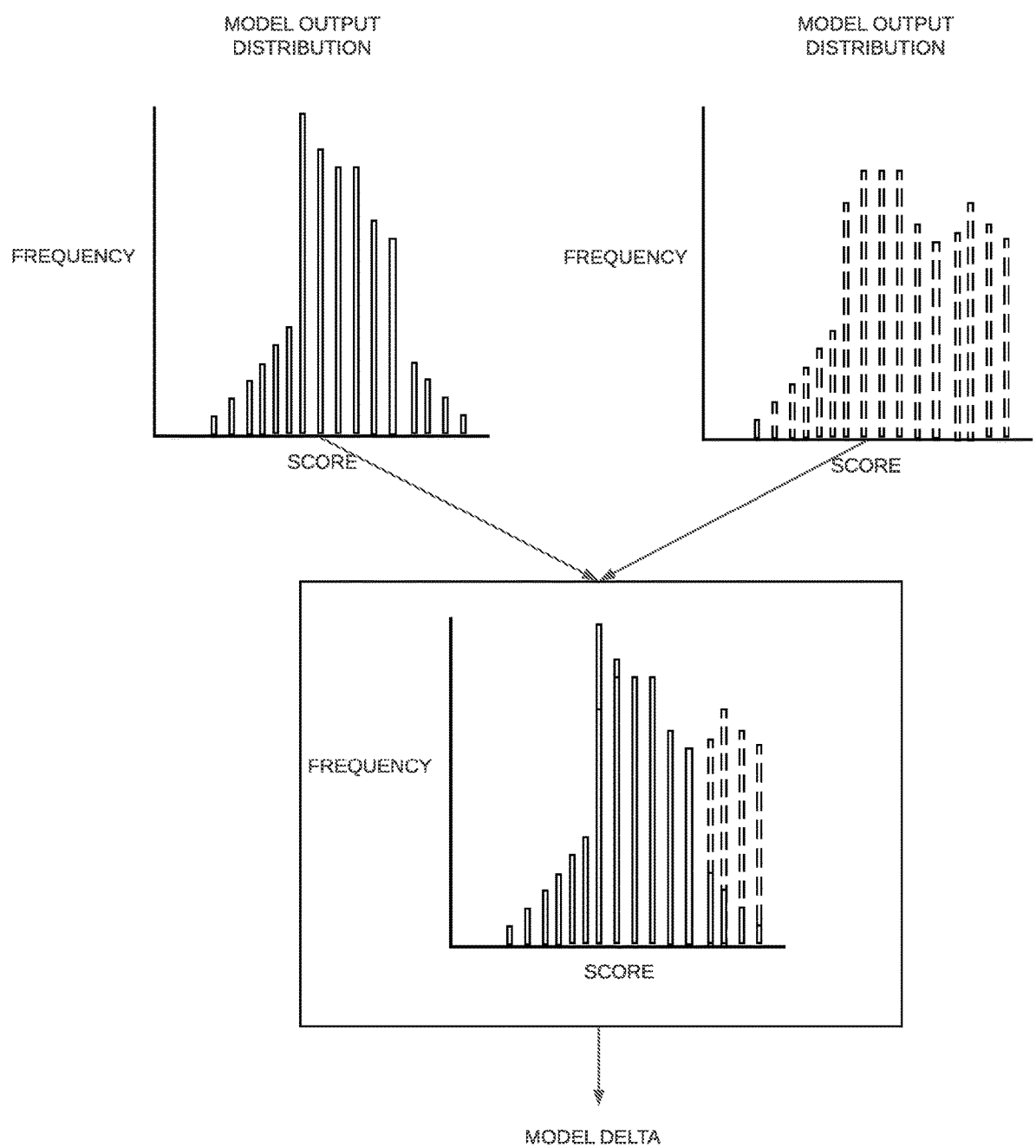
FIG. 5 illustrates an example representation of evaluating, at a model-level, a baseline model threat score distribution and a current model threat score distribution for a subject machine learning-based model in accordance with one or more embodiments of the present application.

In one or more embodiments, evaluating a target machine learning model underpinning an anomalous ensemble (e.g., an anomalous production-implemented threat scoring ensemble) may include retrieving model output data (e.g., threat score distribution data) associated with the target machine learning model at two distinct time periods for a model-level pairwise analysis, as shown generally by way of example in FIG. 5. In such embodiments, S220 may function to collect model output data (e.g., threat score data, threat score distribution data, etc.) associated with the target machine learning model at a current period of time (e.g., most recent week (e.g., a current week), most recent month (e.g., a current month), most recent quarter (e.g., a current quarter), most recent year (e.g., a current year) that may be used to generate a current model output distribution and S220 may further function to collect model output data (e.g., threat score data, threat score distribution data, etc.) of a baseline time period for the same target machine-learning based model (e.g., baseline model output data of a training period, a baseline model output data of a historical time period similar to that of a current time period (e.g., a current time period may be the third quarter of 2021 and a baseline time period may be the third quarter of 2020, a current time period may be a current year (e.g., 2021) and a baseline time period may be a previous year (e.g., 2020)) that may be used to generate a baseline model output distribution.

Accordingly, in one or more embodiments, S220 may function to measure a model difference (or model delta) between a baseline model output distribution and a current model output distribution. In response to computing the model difference (or model delta), S220 may function to assess the computed model delta or computed model variance against one or more model drift thresholds to determine whether a subject machine learning model of an anomalous ensemble should be identified as an errant. For example, in one or more embodiments, S220 may function to identify that one or more machine learning models of a threat scoring ensemble may be errant, two or more machine learning models of a threat scoring ensemble may be errant, three or more machine learning models of a threat scoring ensemble may be errant (e.g., experiencing an anomalous drift behavior, etc.)

Additionally, it shall be noted that S220 may function to automatically evaluate, by one or more computers, each machine learning model of an anomalous threat scoring ensemble by collecting corresponding model output data for a baseline time period and corresponding model output data for a current time period for each respective machine-learning based model of an anomalous threat scoring ensemble. Accordingly, for each distinct machine learning-based model, S220 may function to statistically compare the model output distribution of the baseline time period and the model output distribution of the current time period to compute a model delta (or model difference) therebetween.

Accordingly, in response to computing the model delta (or model difference), S220 may further function to evaluate the computed model delta or model variance corresponding to each distinct machine-learning based model against one or more anomalous model drift thresholds to determine whether one or more machine-learning based models of the anomalous ensemble should be identified or tagged as an errant machine-learning based model of the anomalous ensemble.

In a variant implementation, prior to detecting one or more machine learning-based model of an anomalous digital threat scoring ensemble as having an anomalous drift behavior, S210 may function to source, by one or more computers, threat score data (e.g., threat score distribution data) computed by each machine learning-based model (of the anomalous digital threat scoring ensemble) for each day included within the target period (e.g., a target week, a target month, a target quarter, etc.). In such variant implementation, S210 may function to (e.g., automatically) evaluate, by the one or more computers, the threat score distribution data corresponding to each distinct machine learning-based model to determine if an occurrence of a statistically significant upward trend or a statistically significant downward trend may be present in the threat score distribution data in any one of the one or more machine learning-based models of the anomalous digital threat scoring ensemble over the target period based on or more statistical tests (e.g., Mann-Kendall trend test or the like). Thus, in one or more embodiments, S210 may function to identify (or tag) one or more of the one or more target machine learning-based digital threat scoring models as a drift-experiencing model or the like based on the detecting of the statistically significant upward trend or the statistically significant downward trend, if applicable.

It shall be recognized that S220 may function to simultaneously (or in parallel) identify more than one machine learning-based model of an anomalous digital threat scoring ensemble as anomalous.

It shall be noted that based on identifying one or more errant machine learning models of an anomalous threat scoring ensemble, the system 100 and/or the method 200 may function to further evaluate or investigate one or more errant machine-learning based models at a feature-level as discussed in more detail below.

2.30 Identifying one or more Errant Features of one or more Errant Models | Deep Feature Analysis S230, which includes identifying one or more errant features of one or more errant machine learning-based models, may function to evaluate each of a plurality of features passed to one or more errant machine learning-based models to identify one or more errant (e.g., faulty) features that may be contributing to an errant machine learning model. In one or more preferred embodiments, in response to (or based on) S220 identifying one or more errant machine learning-based models of the anomalous machine learning-based ensemble, S230 may function to further evaluate each errant machine learning model, at a feature-level, to identify one or more errant features that may be contributing to an anomalous threat scoring ensemble. It shall be noted that the term "feature" may also be referred to herein as a "feature variable."

In one or more embodiments, in response to (or based on) the system 100 and/or the method 200 identifying an errant machine learning-based model of an anomalous digital threat scoring ensemble, S230 may function to perform a deep-feature analysis to identify one or more errant features of the errant model. In other words, on a per-errant model basis, S230 may function to individually and/or automatically evaluate, by one or more computers, each feature of a plurality of possible features of an errant machine learning model.

It shall be noted that, in one or more embodiments, individually evaluating each feature of a plurality of possible threat scoring features of an errant machine learning-based model may include collecting target feature data associated with a target errant machine learning model at two distinct time periods for a feature-level pairwise analysis of a target/subject feature. For instance, S230 may function to collect target feature data at a current period of time (e.g., most recent week (e.g., a current week), most recent month (e.g., a current month), most recent quarter (e.g., a current quarter), most recent year (e.g., a current year) that may be used to generate a current feature distribution (for a subject/target feature) and feature data of a baseline time period for the same subject/target feature (e.g., a baseline feature distribution of a training period, a baseline feature distribution of a historical time period similar to that of a current time period (e.g., a current time period may be the third quarter of 2021 and a baseline time period may be the third quarter of 2020, a current time period may be a current year (e.g., 2021) and a baseline time period may be a previous year (e.g., 2020)) that may be used to generate a baseline feature distribution. Accordingly, in one or more embodiments, S230 may further function to measure a feature difference (or feature delta) between a target baseline feature distribution and a target current feature distribution.

In response to computing a feature difference (or feature delta) for a target/subject feature, S230 may function to assess the computed feature delta or feature variance against one or more feature drift thresholds to determine whether the target feature should be identified as an errant or faulty feature of the errant machine learning model of the anomalous ensemble. In other words, in response to identifying all features of an errant model, S220 may function to individually evaluate each threat scoring feature or feature or feature variable at a feature-level to identify one or more errant features of an errant model that may be contributing to an anomalous behavior of the errant model.

It shall be recognized that S230 may function to simultaneously (or in parallel) identify more than one feature of an anomalous or errant machine learning-based model as anomalous.

Figure 6:
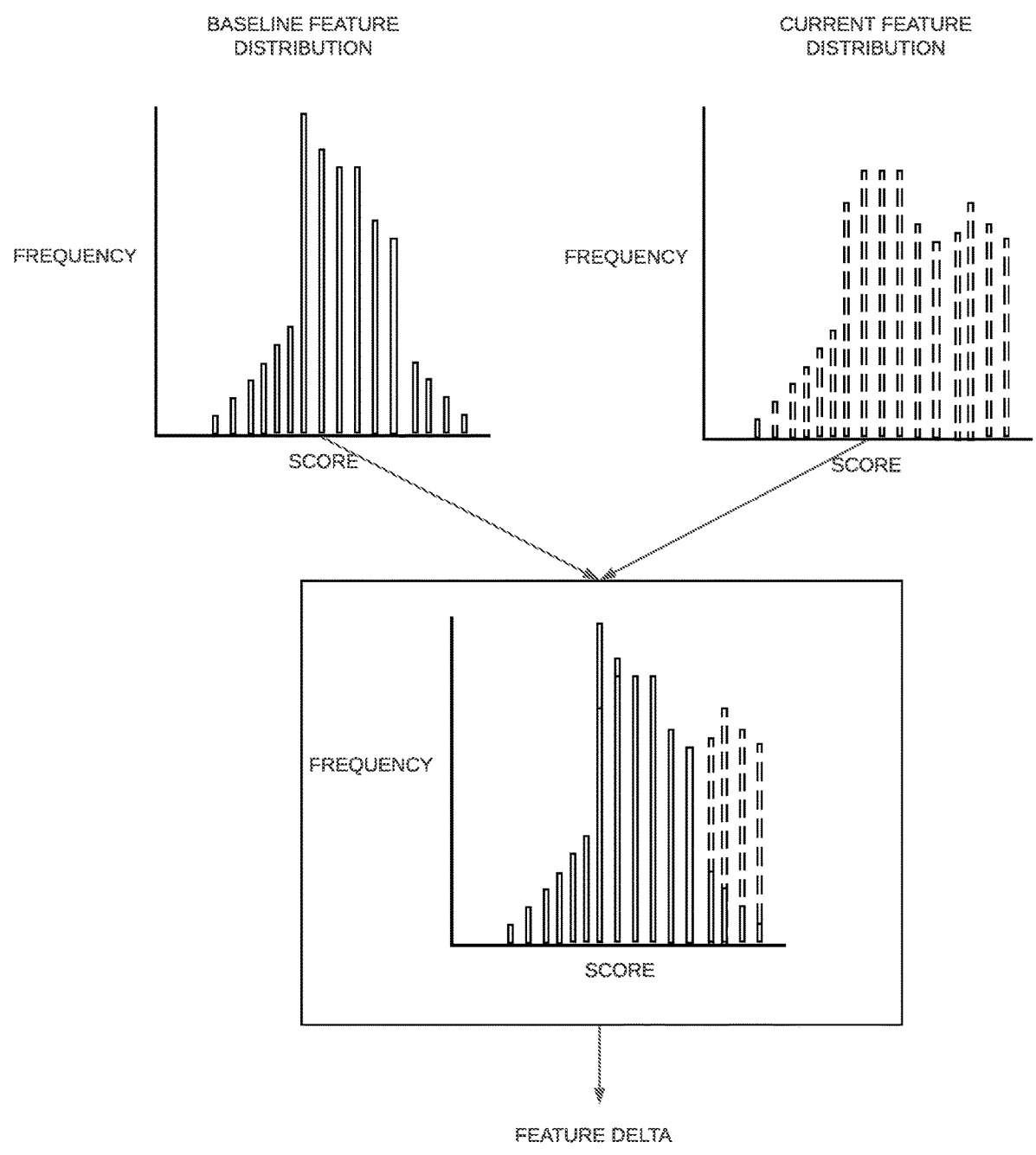
FIG. 6 illustrates an example representation of evaluating, at a feature-level, a baseline feature distribution and a current feature distribution for a subject feature in accordance with one or more embodiments of the present application.

For instance, in one or more embodiments, a plurality of distinct digital threat scoring features (e.g., fifty (50) or more features, seventy-five (75) or more features, one-hundred (100) or more features, or any number of features) may be used as input into one or more errant machine-learning based models. In such example, S230 may function to automatically evaluate, by one or more computers, a first threat scoring feature of an errant model of an anomalous threat scoring ensemble by collecting feature data for the first threat scoring feature at a baseline or historical time period and feature data for the first threat scoring feature at a current time period to statistically compare a baseline threat scoring feature distribution of the first threat scoring feature and a current threat scoring feature distribution of the first threat scoring feature by computing a feature delta (or feature difference) therebetween, as shown generally by way of example in FIG. 6.

Accordingly, in response to computing the feature delta or feature difference of the first threat scoring feature (e.g., a target feature), S230 may function to assess the computed feature delta or feature variance associated with the target threat scoring feature against one or more feature drift thresholds to determine whether the target feature should be identified or tagged as an errant feature of the errant machine-learning based model of the anomalous ensemble. It shall be noted that the above-mentioned steps used to identify if the first feature of an errant machine-learning based model of an anomalous ensemble may be errant or not may be repeated for each of the plurality of features of an errant machine learning-based model.

In a variant implementation, prior to detecting a feature variable (e.g., learnable variable or the like) of an anomalous machine learning-based model as errant (e.g., having an anomalous drift behavior, etc.), S230 may function to source, by one or more computers, feature distribution data corresponding to each feature of a subject machine learning-based for each day included within the target period (e.g., a target week, a target month, a target quarter, etc.). Accordingly, for each feature variable, S210 may function to (e.g., automatically) evaluate, by the one or more computers, to determine if an occurrence of a statistically significant upward trend or a statistically significant downward trend may be present in the feature distribution data for a subject feature over the target period based on or more statistical (trend) tests in analogous ways described above. Thus, in one or more embodiments, S230 may function to identify (or tag) the one or more feature variables (or features) as a drift-experiencing feature or the like based on the detecting of the statistically significant upward trend or the statistically significant downward trend, if applicable.

2.40 Generating a Successor Ensemble

Figure 7:
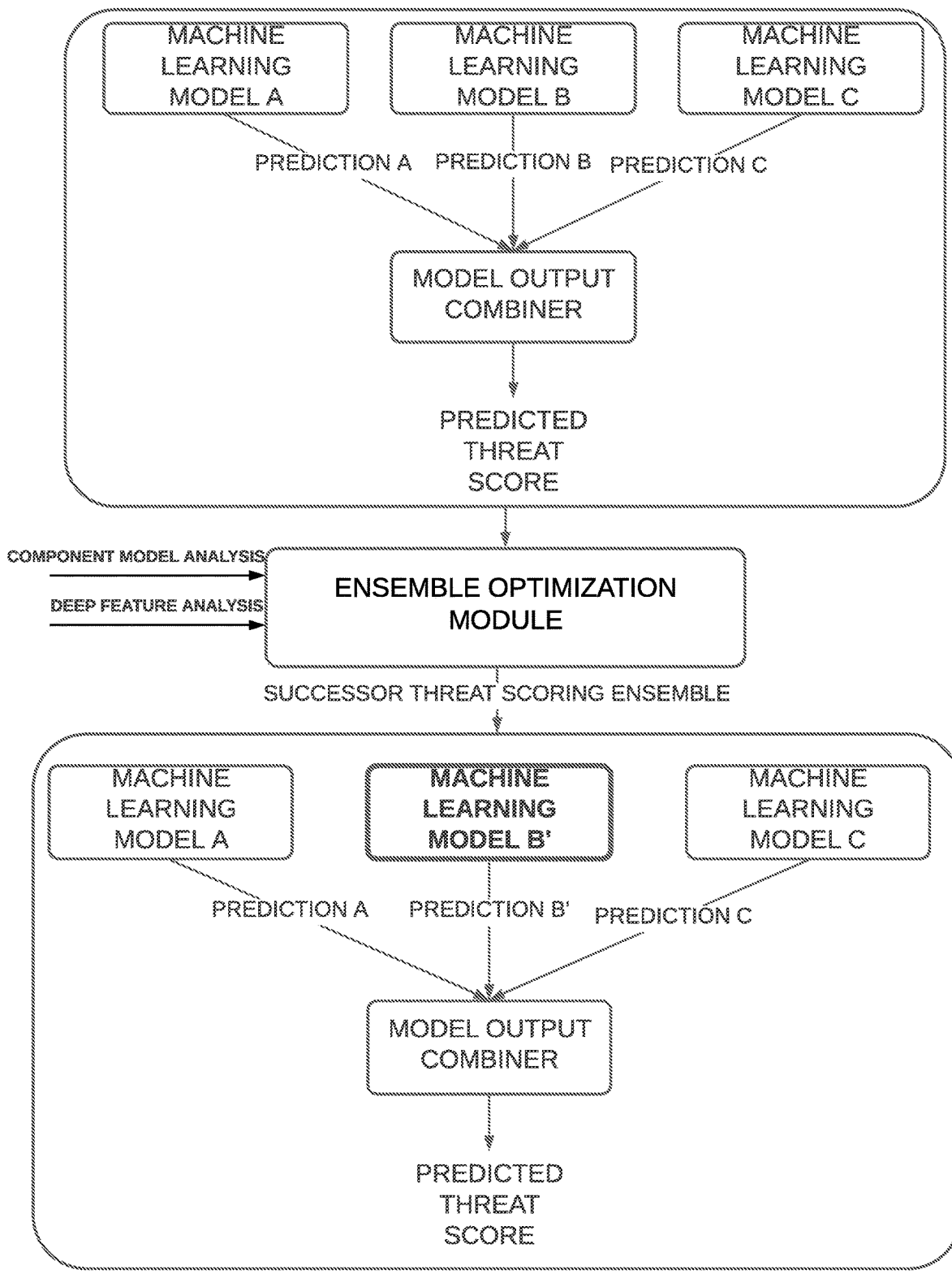
FIG. 7 illustrates an example representation of generating a successor threat scoring ensemble in accordance with one or more embodiments of the present application.
Figure 9:
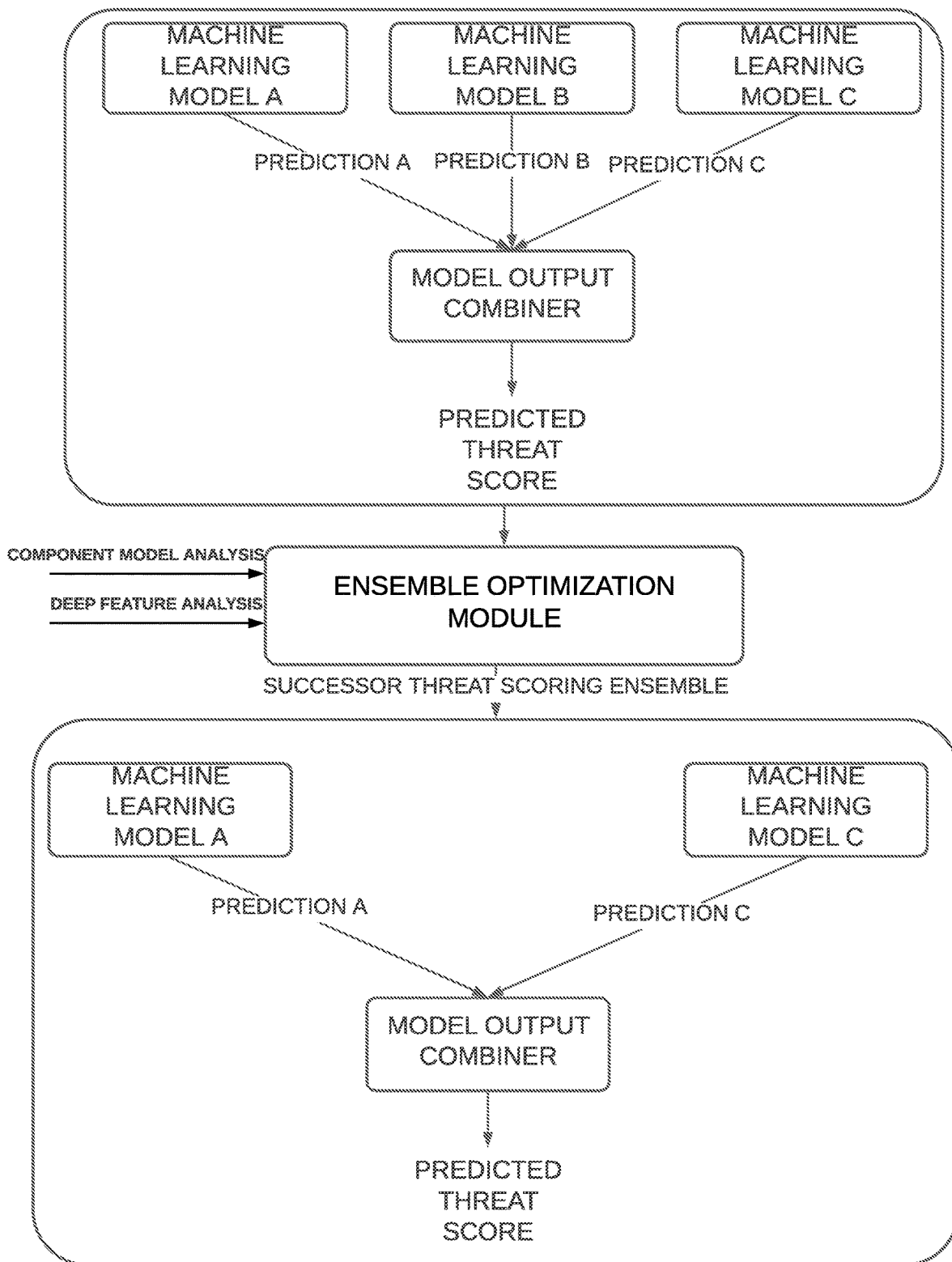
FIG. 9 illustrates an example representation of generating a successor threat scoring ensemble in accordance with one or more embodiments of the present application.

S240, which includes generating a successor machine learning-based digital threat scoring ensemble, may function to intelligently generate a successor machine learning-based digital threat scoring ensemble to replace an (incumbent) anomalous production-implemented digital threat scoring ensemble. In one or more preferred embodiments, S240 may function to generate a plurality of distinct (potential candidate) machine learning-based digital threat scoring ensemble to replace an anomalous threat scoring ensemble that preferably mitigates one or more anomalies of an anomalous threat scoring ensemble, as shown generally by way of example in FIG. 7 and FIG. 9. It shall be noted that, in one or more embodiments, a successor ensemble to an anomalous threat scoring ensemble may be generated based on executing, by one or more computers, one or more intelligent ensemble simulations.

In one or more embodiments, S240 may function to identify or generate a machine learning-based ensemble combination that may maximize a stability of digital threat scores (e.g., reducing a likelihood of future anomalies in computed digital threat scores, drift type anomalies, etc.) and/or maximize a target ensemble performance metric using intelligent ensemble computer-based simulations. In one or more embodiments, the most optimal machine learning-based ensemble combination that be generated (by the one or more ensemble simulations) to replace an anomalous machine learning-based ensemble may be a distinct set of machine learning-based models that is a subset of a larger data repository that includes all possible machine learning-based models capable of being implemented or deployed by the digital threat mitigation platform. For instance, in one or more embodiments, S240 may function to generate a first potential candidate successor ensemble (to replace a target anomalous machine learning-based ensemble) that may include a first distinct machine learning-based model of a first type, a second distinct machine learning-based model of a second type, and a third distinct machine learning-based model of a third type included in the data repository. In the same or another non-limiting example, S240 may function to generate a second potential candidate successor ensemble (to replace the target anomalous machine learning-based ensemble) that may include the third distinct machine learning-based model of the third type, a fourth distinct machine learning-based model of a fourth type, and a fifth distinct machine learning-based model of a fifth type included in the data repository. It shall be noted that S240 may function to generate a machine learning-based ensemble combination that may include any combination and/or quantity of machine learning-based models.

Intelligent ensemble simulations, as generally referred to herein, may relate to automatically generating and simulating potential threat scoring successor ensembles for a target anomalous machine learning-based ensemble preferably based on one or more of the identified errant model(s) of a target ensemble and the one or more errant feature(s) of the errant model(s). In other words, based on the system 100 and/or the method 200 identifying one or more of: an anomalous (e.g., digital threat scoring) ensemble, one or more errant machine learning-based models of the anomalous (threat scoring) ensemble, and one or more errant features of the errant machine learning-based models of the anomalous threat scoring ensemble, S240 may function to generate a plurality of potential successor/candidate digital threat scoring ensembles that mitigate or ameliorate an anomalous behavior of the errant features and/or the errant machine learning models of the anomalous threat scoring ensemble while maintaining a substantially similar or equivalent function as the anomalous (e.g., digital threat scoring) ensemble.

For instance, in one or more embodiments, S240 may function to intelligently generate and simulate a plurality of potential successor (or candidate) threat scoring ensembles based on the system 100 and/or the method 200 identifying one or more errant machine learning models of an anomalous (production-implemented) threat scoring ensemble. In such embodiments, the one or more intelligent ensemble simulations may generate a potential successor machine learning-based digital threat scoring ensemble that may exclude the one or more errant machine learning models (e.g., naïve-bayes machine learning-based model, etc.) from the generation of the new, potential threat scoring successor ensembles. In such instance, S240 may function to generate a plurality of distinct potential threat scoring successors ensembles that may not include the one or more errant machine learning models and simulate, using current or historical digital event data, each of the plurality of potential threat scoring successor ensembles to evaluate if the anomaly may still be present.

Additionally, in the same or another implementation, the one or more intelligent ensemble simulations may function to generate a potential digital threat scoring successor ensemble by removing or excluding the one or more errant machine learning models of the anomalous threat scoring ensemble thereby generating a new ensemble structure having a new combination and quantity (e.g., one less machine learning model) of machine learning models for threat scoring. In such implementation, S240 may function to simulate, using current or historical digital event data, a threat score distribution for each potential threat scoring successor ensemble on current time period data to evaluate if the anomaly may still be occurring in each of the potential threat scoring successor ensemble.

In a second implementation, based on executing one or more intelligent simulations, S240 may function to generate a machine learning model combination for a new, potential successor threat scoring ensemble by adding an additional and/or new machine learning model to a model combination of an anomalous ensemble and then simulating the potential threat scoring successor ensemble on current time period data to evaluate if the anomaly may still be occurring in the potential threat scoring successor ensemble. In such second implementation, the additional and/or new machine learning-based model may not have been previously included in the anomalous ensemble.

In a third implementation, via one or more intelligent simulations, S240 may function to generate a potential threat scoring successor ensemble by removing an identified errant machine learning model from an anomalous threat scoring ensemble and implementing a new machine learning-based model to replace the removed errant machine learning model and then simulating the potential successor ensemble on the current time period data to evaluate if the anomaly may still be occurring in the potential threat scoring successor ensemble. That is, in this third implementation via an ensemble simulation engine or the like, S240 may function to create new machine learning model combinations for a potential threat scoring successor ensemble by swapping out an errant machine learning model and injecting a new machine learning model in the place of the errant machine learning model. S240 may function to iteratively perform the model swap within potential threat scoring ensembles until one or more ensembles which perform better than the target (incumbent) ensemble is/are identified.

Additionally, or alternatively, S240 may function to perform intelligent simulations at a feature-level based on identifying one or more errant features in an anomalous threat scoring ensemble. For example, in one or more embodiments, S240 may function to generate a potential threat scoring successor ensemble by removing or excluding an input of one or more identified errant features and then S240 may further function to simulate the potential threat scoring successor ensemble on current time period data (e.g., digital threat data of the current time period) to evaluate if the anomaly may still be occurring in the potential threat scoring successor ensemble.

In another embodiment, S240 may function perform targeted simulations on errant features by adjusting learned feature weights of one or more identified errant features (e.g., increasing the learned feature weight of an errant feature, decreasing the learned feature weight of an errant feature) and S240 may further function to simulate the potential successor ensemble on current time period data to evaluate if the anomaly may still be occurring in the potential threat scoring successor ensemble.

In yet another embodiment, S240 may function to modify a feature extractor and/or feature vectorizer to mitigate an anomalous behavior of a target ensemble based on feature vector inputs associated with an errant feature. In such embodiment, a feature extractor may be modified to limit or increase an extraction of the errant feature from a corpus of data. Likewise, a feature vectorizer may be modified and encoded to produce an improved value for the errant feature that mitigates or ameliorates a contribution by the errant feature to an anomalous behavior of a target errant model.

It shall be noted that as S240 has the capability of automatically generating and simulating, by one or more computers, a plurality of potential (candidate) successor digital threat scoring ensembles, an optimized successor threat scoring ensemble may be (e.g., automatically)

selected/identified, by the one or more computers, to replace an anomalous ensemble based on one or more ensemble metrics (e.g., an ensemble stability metric, an ensemble accuracy metric, combinations thereof, etc.). In other words, an optimized threat scoring ensemble that may replace an anomalous (production-implemented) threat scoring ensemble may be selected based on maximizing a preferred or selected ensemble metric (e.g., an ensemble accuracy metric, an ensemble stability metric, a maximized ensemble accuracy/stability metric). It shall be noted that, in one or more embodiments, the ensemble (e.g., score) stability metric may be satisfied if a trend of the threat score distribution data for the target period is below a predetermined drift threshold, a slope of the threat score distribution data for the target period is below a predetermined drift threshold, a statistically significant upward or downward trend in the threat score distribution data is not present in the target period or the like.

For instance, in a nonlimiting example, S240 may function to generate, by executing one or more intelligent ensemble simulations, a plurality of distinct potential candidate successor machine learning-based digital threat scoring ensembles (e.g., potential candidate successor machine learning-based digital threat scoring ensemble A, potential candidate successor machine learning-based digital threat scoring ensemble B, potential candidate successor machine learning-based digital threat scoring ensemble C . . . potential candidate successor machine learning-based digital threat scoring ensemble N, etc). In such nonlimiting example, S240 may function pare down the plurality of distinct potential candidate successor machine learning-based digital threat score ensemble to a pre-defined quantity (e.g., top five (5), top ten (10), or any suitable number) based on maximizing a first distinct ensemble metric type (e.g., f1 score, area under the curve as described in U.S. Pat. No. 10,339,472 which is incorporated in its entirety by this reference, etc.). Additionally, or alternatively, in such nonlimiting example, S240 may function to identify, from the pare down of the plurality of distinct potential candidate successor machine learning-based, an optimized potential candidate successor machine learning-based ensemble (e.g., preferred potential candidate successor machine learning-based ensemble) based on maximizing a second distinct ensemble metric type distinct from the first distinct metric type (e.g., stability metric, score stability metric or the like). Accordingly, S240 may function to replace the anomalous machine learning-based digital threat scoring ensemble with the potential candidate successor machine learning-based digital threat scoring ensemble (e.g., the preferred potential candidate successor machine learning-based ensemble).

It shall be recognized that in one or more embodiments, a successor threat scoring ensemble may not replace an anomalous production-implemented model until validation that the optimized ensemble may be operating at a preferred state (e.g., mitigating the anomalous drift behavior).

2.50 Constructing Intelligent Ensemble Artifacts for a Subscriber of a Drift-Experiencing Ensemble Optionally, S250, which includes constructing one or more intelligent ensemble artifacts for a subscriber of an anomaly-experiencing ensemble, may function to automatically (or system-generate) an intelligent ensemble storyboard for a target subscriber in response to the subscriber having or being impacted by an anomaly-experiencing ensemble. In one or more preferred embodiments, S250 may function to automatically construct (or system-generate) an intelligent ensemble storyboard for a target subscriber that may include one or more system-generated textual-based finding artifacts and/or one or more system-generated graphical-based finding artifacts that may function to support an explanation of any deviations and/or anomalous behaviors of the anomaly-experiencing ensemble. Additionally, or optionally in one or more embodiments, an intelligent ensemble storyboard may be published to a web interface (e.g., the web interface 120) that may be used to explain an anomaly-experiencing ensemble to a target subscriber and proposed mitigation options to the anomaly experiencing ensemble (e.g., a successor threat scoring ensemble).

In a first implementation, S250 may function to generate and display, on a web-based user interface of the digital threat mitigation service, one or more anomalous ensemble artifacts. In such implementation, the one or more anomalous ensemble artifacts may include one or more pieces of explainable content that provides a rationale and/or findings that describes how the machine learning-based digital threat scoring ensemble was identified, one or more pieces of explainable content that provides a rationale and/or findings that describes how the at least one machine learning-based model contributed to the anomalous drift behavior and/or how the at least one errant feature contributed to the anomalous drift behavior, and one or more pieces of explainable content that provides a rationale and/or findings that describes a rationale for replacing the machine learning-based digital threat scoring ensemble with the potential successor machine learning-based digital threat scoring ensemble.

In a second implementation, S250 may function generate and display, on a web-based user interface of the digital threat mitigation platform, an anomalous ensemble artifact accessible to a target subscriber that may have been impacted by a subject anomalous machine learning-based digital threat scoring ensemble. In such implementation, the anomalous ensemble artifact may include one or more pieces of explainable content that informs the target subscriber of a rationale and/or findings on how the anomalous machine learning-based digital threat scoring ensemble was identified, one or more pieces of explainable content that informs the target subscriber of a rationale and/or findings on how the at least one machine learning-based model contributed to the anomalous drift behavior, and/or one or more pieces of explainable content that informs the target subscriber of a rationale and/or findings for replacing the anomalous machine learning-based digital with the one of the plurality of candidate successor machine learning-based ensembles.

Figure 8:
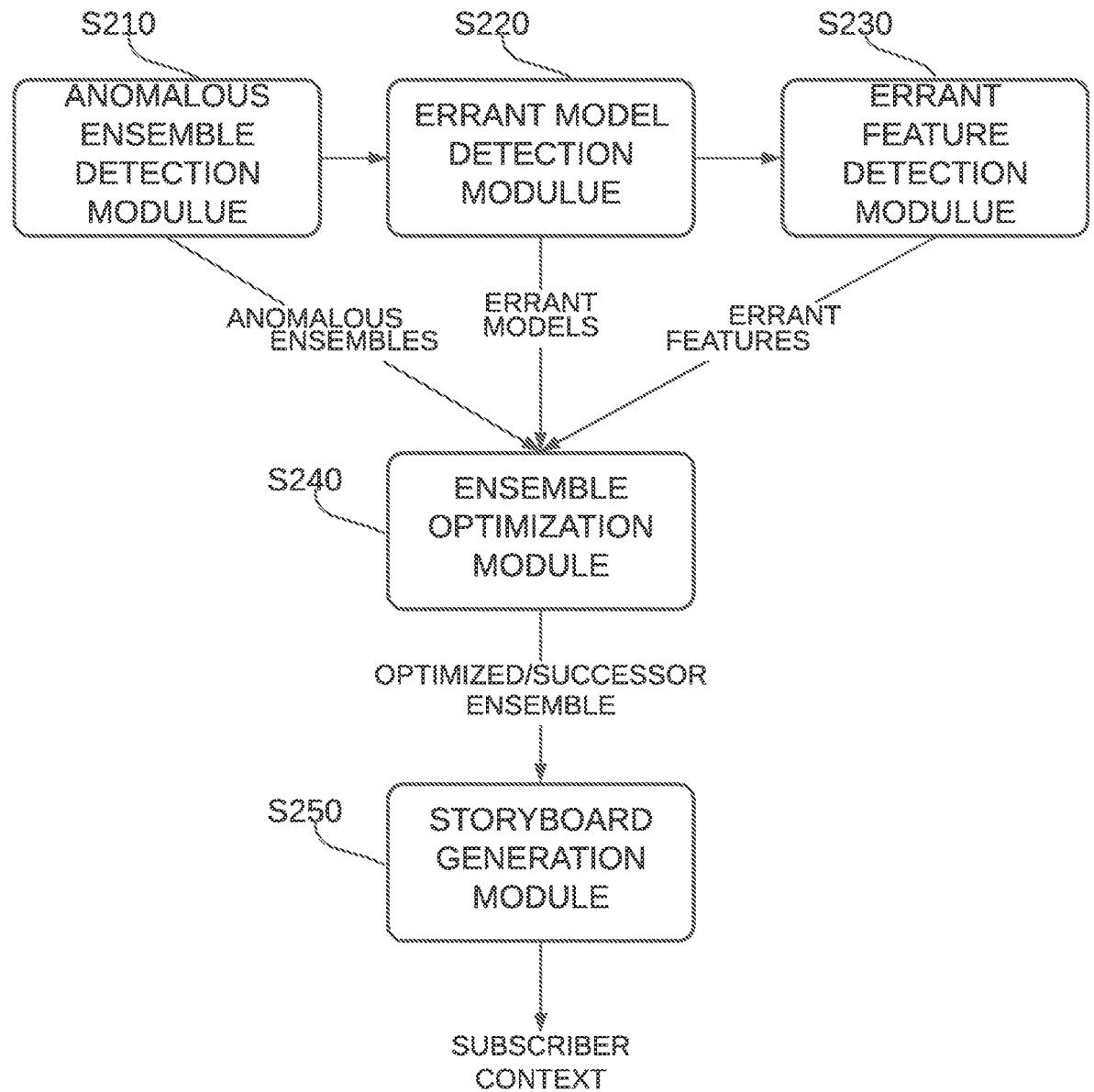
FIG. 8 illustrates an example schematic for implementing portions of the method 200 and a system in accordance with one or more embodiments of the present application.

It shall be noted that one or more of the preceding steps of S210, S220, S230, and/or S240 may function to construct intelligent rationale and context behind an anomaly-experiencing ensemble and S250 may function to receive, as input, the intelligent rational and context behind an anomaly-experiencing ensemble. For instance, S210 may function to identify an anomaly-experiencing ensemble that may be passed as input to S250, S220 may function to identify one or more errant machine learning models of the anomaly-experiencing threat scoring ensemble that may be passed as input to S250, S230 may function to identify one or more errant features of one or more errant machine learning models that may be passed as input to S250, and S240 may function to generate a proposed (or replacement) threat scoring successor ensemble that mitigates one or more anomalies of the anomaly-experiencing ensemble that may be passed as input to S250, as shown generally by way of example in FIG. 8.

Accordingly, in response to S250 receiving one or more inputs from one or more of the aforementioned steps of S210, S220, S230, and/or S240, S250 may function to system-generate or service-generate, by one or more computers, one or more textual artifacts and/or one or more graphical artifacts that intelligently communicates through explainable content the rationale or findings behind the anomaly-experiencing ensemble and a proposed successor ensemble to the anomalous production-implemented threat scoring ensemble.

At least one technical benefit of system-generating an intelligent ensemble findings storyboard may be to efficiently and transparently communicate ensemble anomalies (e.g., drift-type anomalies) to target subscribers and proposed mitigation options and replacement options through consumable and explainable artifacts.

Automated Decisioning Workflows

In one or more embodiments, a subject anomalous machine learning-based ensemble may be associated with a target subscriber implementing a plurality of automated decisioning workflows digitally dependent or associated on the subject anomalous machine learning-based ensemble, as described in U.S. patent application Ser. No. 15/653,354 and 63/301,938, which are incorporated in their entireties by this reference. In operation, an automated decisioning workflow may function to automatically approve, block, or review a target digital event based on a digital threat score value computed by a machine learning-based digital threat scoring ensemble (e.g., the anomalous machine learning-based ensemble) implemented by the digital threat mitigation service for a target subscriber.

In one or more embodiments, S250 may function to automatically replace, by one or more computers, the anomalous machine learning-based ensemble with a successor machine learning-based if the successor machine learning-based ensemble mitigates the anomalous drift behavior and/or replacing the anomalous machine learning-based ensemble with the successor machine learning-based ensemble prevents the target subscriber from having to modify the plurality of automated decisioning workflows (e.g., the subscriber does not have to modify the score ranges, parameters, and/or attributes of the plurality of automated decisioning workflows). In such embodiments, S250 may function to forego notifying the target subscriber about the replacing the anomalous machine learning-based ensemble with the successor machine learning-based.

In one or more embodiments, S250 may function to automatically replace, by one or more computers, the anomalous machine learning-based ensemble with a successor machine learning-based and the replacing may include notifying the target subscriber about the replacing if the replacing impacts at least one automated decisioning workflow of the plurality of automated decisioning workflows (e.g., the subscriber may need to modify the score ranges, parameters, and/or attributes of at least one of the plurality of automated decisioning workflows).

It shall be further noted that the method 200 steps may be simultaneously performed based on identifying more than one anomalous machine learning-based digital threat scoring ensemble. That is, in one or more embodiments, based on or in response to the system or service 100 implementing the method 200 identifying or detecting at least two anomalous machine learning-based digital threat scoring ensembles, the method 200 may simultaneously (e.g., in parallel) execute, by one or more computers, one or more steps of the method 200 (e.g., S210, S220, S230, S240, and/or S250) for each distinct anomalous machine learning-based digital threat scoring ensemble.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for accelerated anomaly detection and replacement of an anomaly-experiencing machine learning-based ensemble, the method comprising:
   identifying, by one or more computers, a machine learning-based digital threat scoring ensemble having an anomalous drift behavior in digital threat score inferences computed by the machine learning-based digital threat scoring ensemble for a target period;
   executing, based on the identifying, a tiered anomaly evaluation for the machine learning-based digital threat scoring ensemble, wherein the tiered anomaly evaluation includes:
   (a) identifying at least one machine learning-based model of the machine learning-based digital threat scoring ensemble contributing to the anomalous drift behavior, and
   (b) identifying at least one feature variable of the at least one machine learning-based model contributing to the anomalous drift behavior;
   generating a potential successor machine learning-based digital threat scoring ensemble to the machine learning-based digital threat scoring ensemble based on the tiered anomaly evaluation, wherein the potential successor machine learning-based digital threat scoring ensemble mitigates the anomalous drift behavior; and
   replacing the machine learning-based digital threat scoring ensemble with the potential successor machine learning-based digital threat scoring ensemble based on one or more ensemble metrics computed for the potential successor machine learning-based digital threat scoring ensemble satisfying one or more efficacy benchmarks.

2. The method according to claim 1, further comprising:
   sourcing, by the one or more computers, threat score distribution data computed by the machine learning-based digital threat scoring ensemble for each day included within the target period; and
   detecting, by the one or more computers, an occurrence of a statistically significant upward trend or a statistically significant downward trend in the threat score distribution data over the target period,
wherein:
the identifying the machine learning-based digital threat scoring ensemble is based on the detecting of the statistically significant upward trend or the statistically significant downward trend.

3. The method according to claim 1, further comprising:
executing one or more intelligent ensemble simulations that inform a structure of the potential successor machine learning-based digital threat scoring ensemble, and
the structure of the potential successor machine learning-based digital threat scoring ensemble excludes the at least one machine learning-based model of the machine learning-based digital threat scoring ensemble contributing to the anomalous drift behavior,
wherein the generating the potential successor machine learning-based digital threat scoring ensemble is further based on the execution of the one or more intelligent ensemble simulations.

4. The method according to claim 1, further comprising:
executing one or more intelligent ensemble simulations that inform a structure of the potential successor machine learning-based digital threat scoring ensemble, and
the structure of the potential successor machine learning-based digital threat scoring ensemble includes a machine learning-based model of a distinct type in substitution of the at least one machine learning-based model of the machine learning-based digital threat scoring ensemble contributing to the anomalous drift behavior,
wherein the generating the potential successor machine learning-based digital threat scoring ensemble is further based on the execution of the one or more intelligent ensemble simulations.

5. The method according to claim 1, further comprising:
executing one or more intelligent ensemble simulations that inform a structure of the potential successor machine learning-based digital threat scoring ensemble, and
the structure of the potential successor machine learning-based digital threat scoring ensemble excludes, as model input, the at least one feature variable contributing to the anomalous drift behavior,
wherein the generating the potential successor machine learning-based digital threat scoring ensemble is further based on the execution of the one or more intelligent ensemble simulations.

6. The method according to claim 1, further comprising:
executing one or more intelligent ensemble simulations that inform a structure of the potential successor machine learning-based digital threat scoring ensemble, and
the structure of the potential successor machine learning-based digital threat scoring ensemble is associated with an increase in the learned feature weighting of the at least one feature variable contributing to the anomalous drift behavior.

7. The method according to claim 1, further comprising:
executing one or more intelligent ensemble simulations that inform a structure of the potential successor machine learning-based digital threat scoring ensemble, and
the structure of the potential successor machine learning-based digital threat scoring ensemble is associated with a decrease in the learned feature weighting of the at least one feature variable contributing to the anomalous drift behavior.

8. The method according to claim 1, wherein
the machine learning-based digital threat scoring ensemble is one of a volume of distinct machine learning-based digital threat scoring ensembles in operational use by a digital threat mitigation service, and
one or more machine learning-based digital threat scoring ensembles of the volume is implemented for a distinct subscriber subscribing to the digital threat mitigation service.

9. The method according to claim 8, further comprising:
generating an anomaly rationale based on findings data derived from the tiered anomaly evaluation for the at least one machine learning-based model or the at least one feature variable contributing to the anomalous drift behavior;
displaying, on a web-based user interface of the digital threat mitigation service, one or more anomalous ensemble artifacts, wherein the one or more anomalous ensemble artifacts include:
one or more pieces of explainable content that provides the anomaly rationale for the at least one machine learning-based model or the at least one feature variable contributing to the anomalous drift behavior.

10. A method for accelerated drift detection and replacement of a drift-experiencing machine learning-based ensemble, the method comprising:
evaluating, by one or more computers, a plurality of machine learning-based digital threat scoring ensembles in operational use by a digital threat mitigation platform;
identifying, by the one or more computers, an anomalous machine learning-based digital threat scoring ensemble experiencing an anomalous drift behavior based on the evaluation;
executing, by the one or more computers, an anomaly evaluation for the anomalous machine learning-based digital threat scoring ensemble based on the identifying, wherein the anomaly evaluation includes:
detecting at least one errant machine learning-based model of the anomalous machine learning-based digital threat scoring ensemble contributing to the anomalous drift behavior;
generating, based on executing one or more intelligent ensemble simulations, a plurality of candidate successor machine learning-based ensembles to the anomalous machine learning-based digital threat scoring ensemble; and
replacing, by the one or more computers, the anomalous machine learning-based digital threat scoring ensemble with one of the plurality of candidate successor machine learning-based ensembles based on one or more ensemble metrics computed for the one of the plurality of candidate successor machine learning-based ensembles satisfying or exceeding one or more ensemble efficacy benchmarks.

11. The method according to claim 10, wherein
the identifying the anomalous machine learning-based digital threat scoring ensemble occurs prior to a subscriber associated with the anomalous machine learning-based digital threat scoring ensemble identifying the anomalous drift behavior.

12. The method according to claim 11, wherein
replacing the anomalous machine learning-based digital threat scoring ensemble with the one of the plurality of candidate successor machine learning-based ensembles occurs before the subscriber associated with the anomalous machine learning-based digital threat scoring ensemble identifies the anomalous drift behavior.

13. The method according to claim 10, further comprising:
computing, by the one or more computers, for each of the plurality of candidate successor machine learning-based ensembles an ensemble accuracy value based on simulation results of the one or more intelligent ensemble simulations;
identifying, by the or more computers, a target candidate successor machine learning-based ensemble of the plurality of candidate successor machine learning-based ensembles that maximizes an ensemble accuracy efficacy metric; and
automatically replacing, by the one or more computers, the anomalous machine learning-based digital threat scoring ensemble with the target candidate successor machine learning-based ensemble based on the identifying.

14. The method according to claim 10, further comprising:
computing, by the one or more computers, for each of the plurality of candidate successor machine learning-based ensembles an ensemble stability value based on simulation results of the one or more intelligent ensemble simulations;
identifying, by the or more computers, a target candidate successor machine learning-based ensemble of the plurality of candidate successor machine learning-based ensembles that maximizes an ensemble stability efficacy metric; and
automatically replacing, by the one or more computers, the anomalous machine learning-based digital threat scoring ensemble with the target candidate successor machine learning-based ensemble based on the identifying.

15. The method according to claim 10, further comprising:
generating an anomaly rationale based on findings data derived from the anomaly evaluation;
generating an ensemble replacement rationale based on simulation results derived from the one or more intelligent ensemble simulations;
displaying, on a web-based user interface of the digital threat mitigation platform, an anomalous ensemble artifact accessible to a target subscriber impacted by the anomalous machine learning-based digital threat scoring ensemble, wherein the anomalous ensemble artifact includes:
(1) one or more pieces of explainable content that provides the anomaly rationale for the at least one errant machine learning-based model contributing to the anomalous drift behavior, and
(2) one or more pieces of explainable content that provides the ensemble replacement rationale for replacing the anomalous machine learning-based digital with the one of the plurality of candidate successor machine learning-based ensembles.

16. A method for accelerated drift detection and replacement of an anomaly-experiencing machine learning-based ensemble, the method comprising:
evaluating, by one or more computers, a plurality of machine learning-based ensembles in operational use by a digital threat mitigation platform for a target period;
identifying, by the one or more computers, an anomalous machine learning-based ensemble experiencing an anomalous drift behavior based on the evaluation;
generating, by the one or more computers, at least one successor machine learning-based ensemble for the anomalous machine learning-based ensemble based on performing one or more intelligent ensemble simulations; and
replacing, by the one or more computers, the anomalous machine learning-based ensemble experiencing the anomalous drift behavior with the at least one successor machine learning-based ensemble based on the at least one successor machine learning-based ensemble satisfying one or more ensemble characteristics.

17. The method according to claim 16, wherein:
the anomalous machine learning-based ensemble is associated with a target subscriber implementing a plurality of automated decisioning workflows digitally associated with the anomalous machine learning-based ensemble; and
the one or more ensemble characteristics corresponds to a confirmation that:
(1) the at least one successor machine learning-based ensemble mitigates the anomalous drift behavior, and
(2) replacing the anomalous machine learning-based ensemble with the at least one successor machine learning-based ensemble prevents the target subscriber from having to modify the plurality of automated decisioning workflows.

18. The method according to claim 16, wherein:
the anomalous machine learning-based ensemble is associated with a target subscriber implementing a plurality of automated decisioning workflows digitally associated with the anomalous machine learning-based ensemble; and
replacing the anomalous machine learning-based ensemble with the at least one successor machine learning-based includes notifying the target subscriber about the replacing if the replacing impacts at least one automated decisioning workflow of the plurality of automated decisioning workflows.

19. The method according to claim 16, wherein:
the anomalous machine learning-based ensemble experiencing the anomalous drift behavior is automatically identified by the one or more computers based on observing a statistically significant downward trend or a statistically significant upward trend in threat score distribution data over the target period.

20. The method according to claim 16, wherein:
the method is implemented by a digital threat mitigation service, and
the digital threat mitigation service automatically executes the method at predetermined intervals.

* * * * *